Aug. 15, 1950     E. P. SCHMIDT     2,518,942
METHOD OF ASSEMBLING FULL COMPLEMENT BALL BEARINGS
Filed Feb. 23, 1945
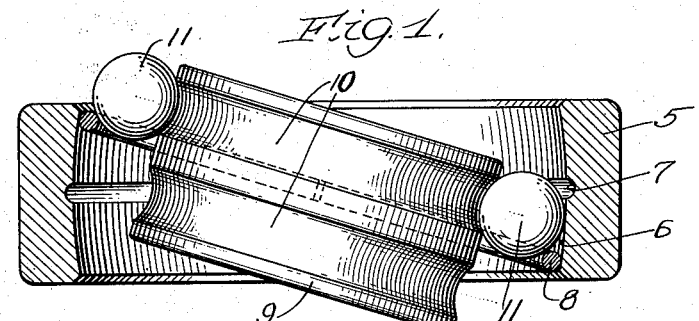
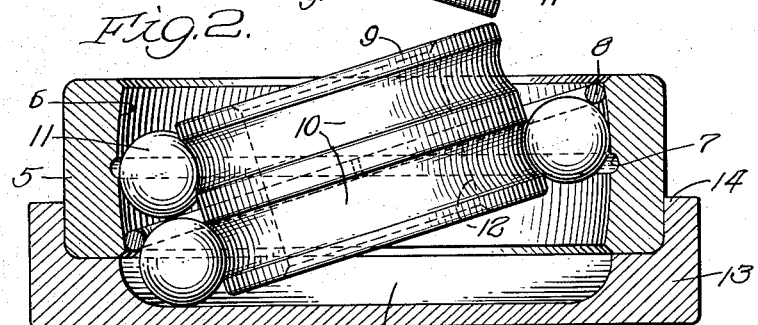
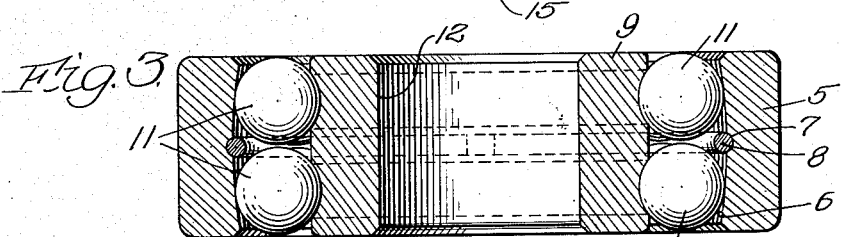
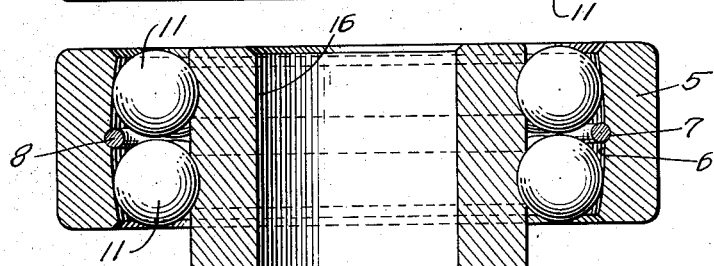
Inventor:
Edward P. Schmidt Patented Aug. 15, 1950

2,518,942

UNITED STATES PATENT OFFICE 2,518,942

METHOD OF ASSEMBLING A FULL COMPLEMENT BALL BEARING

Edward P. Schmidt, Brookfield, Ill.

Application February 23, 1945, Serial No. 579,419

1 Claim. (Cl. 29—148.4)

This invention relates to ball bearings, and more particularly to an improved construction and method of assembling balls in an inner and outer race.

The primary object of the invention is to provide an improved ball bearing having two rows of balls which are separated by a simple retainer member.

A further object of the invention is to provide a simple construction wherein an inner member having two annular races may be placed within an outer race with its axis biased from that of the outer race, and after the balls have been inserted, the retainer ring may be snapped into position by bringing the axes into alignment.

The invention is illustrated in a preferred embodiment in the accompanying drawing, in which—

Figure 1 is an elevational view with the outer member and retainer ring in section, showing the position of the parts when one row of balls is installed; Fig. 2, a similar view showing a cap construction applied to the assembly, which has been inverted from the position shown in Fig. 1, to permit a second row of balls to be installed; Fig. 3, a sectional view of the assembled bearing; and Fig. 4, a view similar to Fig. 3, but showing a modified inner member.

In the embodiment illustrated, a circular outer member 5 is in the form of an annulus, and has a concave face 6 which forms an outer race for balls. The member is provided with a centrally disposed annular groove 7, to receive a retainer member 8, which preferably is in the form of a split ring, and is formed of resilient wire so that it may snap into the groove 7.

An inner member 9 is provided with a pair of spaced grooves 10, which serve as races for balls 11, of the usual construction. Preferably the inner member has an opening 12 to fit onto a suitable shaft, not shown.

To assemble the bearing, the retainer ring 8 is collapsed slightly and placed within the outer member 6, as shown in Fig. 1. The inner member 9 may then be placed within the outer member with its axis biased from the axis of the outer member, as shown in Fig. 1, and an upper row of balls 11 are placed in the upper race. Preferably a cap member 13, having a flange 14 and a cavity 15, is then placed over the parts and the assembly is inverted to the position shown in Fig. 2, where a second row of balls may be inserted. By twisting the inner member to the position shown in Fig. 3, so that the axes of the inner and outer members are brought into alignment, the balls will press the retainer ring 8 inwardly until it snaps into the groove 7, to complete assembly of the bearing and render it ready for use.

In the modification shown in Fig. 4, the construction of the parts is similar to that shown above, except that an inner member 16 is extended, as indicated at 17, to provide a collar which may be provided with suitable tapped holes 18 to enable the bearing to be secured to a shaft.

The foregoing detailed description is given for clearness of understanding only, and no unnecessary limitations should be understood therefrom, for some modifications will be obvious to thoe skilled in the art.

I claim:

The method of assembling a full complement ball bearing which comprises: placing an inner race within an outer race with one axis biased at an acute angle from that of the other, placing a split spring retainer in the outer race in biased relation to said outer race, placing one row of balls in said inner race, placing a cap over one end of the bearing to cooperate with said outer race to retain the balls in the inner race, inverting the bearing and inserting a second row of balls in the inner race from the uncapped side, and twisting the retainer into an inner groove in the outer race by pressure applied through said balls.

EDWARD P. SCHMIDT.

REFERENCES CITED

The following references are of record in the file of this patent:

UNITED STATES PATENTS

| Number | Name | Date |
|---|---|---|
| 1,153,066 | Gurney | Sept. 7, 1915 |
| 1,172,648 | Vorraber | Feb. 22, 1916 |
| 1,451,531 | Brunner | Apr. 10, 1923 |
| 1,480,975 | Wickland | Jan. 15, 1924 |
| 1,783,791 | Hughes | Dec. 2, 1930 |
| 1,906,259 | Gibbons | May 3, 1933 |